(12) United States Patent
Koyama et al.

(10) Patent No.: US 7,519,968 B2
(45) Date of Patent: Apr. 14, 2009

(54) DECENTRALIZED CONTROL SYSTEM FOR NETWORK CONNECTION

(75) Inventors: Masahiro Koyama, Ibaraki-ken (JP); Norihisa Miyake, Matsudo (JP); Kenjiro Fujii, Yachiyo (JP)

(73) Assignee: Hitachi, Ltd., Tokyo (JP)

( * ) Notice: Subject to any disclaimer, the term of this patent is extended or adjusted under 35 U.S.C. 154(b) by 661 days.

(21) Appl. No.: 10/812,881

(22) Filed: Mar. 31, 2004

(65) Prior Publication Data

US 2004/0230980 A1    Nov. 18, 2004

Related U.S. Application Data

(63) Continuation of application No. 09/398,776, filed on Sep. 20, 1999, now abandoned.

(30) Foreign Application Priority Data

Mar. 10, 1999  (JP) ................................. 11-062717

(51) Int. Cl.
*G06F 9/46* (2006.01)
(52) U.S. Cl. .................. 718/105; 718/104; 718/106
(58) Field of Classification Search ........................ None
See application file for complete search history.

(56) References Cited

U.S. PATENT DOCUMENTS

| | | |
|---|---|---|
| 4,769,771 A | 9/1988 | Lipmann et al. |
| 5,138,708 A | 8/1992 | Vosbury |
| 5,142,683 A | 8/1992 | Burkhardt et al. |
| 5,185,861 A | 2/1993 | Valencia |
| 5,187,791 A | 2/1993 | Baum |
| 5,418,953 A | 5/1995 | Hunt et al. |
| 5,452,452 A | 9/1995 | Gaetner et al. |
| 5,555,179 A | 9/1996 | Koyama et al. |
| 5,592,671 A * | 1/1997 | Hirayama .................... 718/104 |
| 5,745,452 A | 4/1998 | Lecourtier |
| 5,838,912 A | 11/1998 | Poon et al. |
| 5,844,888 A | 12/1998 | Markkula et al. |

(Continued)

FOREIGN PATENT DOCUMENTS

JP    5-250337    9/1993

(Continued)

OTHER PUBLICATIONS

Sterling et al., "Communication Overhead for Space Science Application on the Beowulf Parallel Workstation", IEEE, p. 23-30, 1995.

(Continued)

*Primary Examiner*—Christian LaForgia
(74) *Attorney, Agent, or Firm*—Mattingly, Stanger, Malur & Brundidge, P.C.

(57) ABSTRACT

In a decentralized control system, a program of the system is described in one form to flexibly cope with changes of the system, and the program developing efficiency, processing performance, and reliability of the system are increased. In configuration, a plurality of control processors and a plurality of devices are connected to a network, the control processors connected to the network are automatically detected and there is determined program execution assignment to possibly equalize the processing load imposed on the control processors. Each control processor executes the program in accordance with the program execution assignment.

1 Claim, 11 Drawing Sheets

U.S. PATENT DOCUMENTS

| | | | |
|---|---|---|---|
| 5,860,137 A * | 1/1999 | Raz et al. | 711/202 |
| 5,887,143 A | 3/1999 | Saito et al. | |
| 5,961,585 A | 10/1999 | Hamlin | |
| 5,978,831 A * | 11/1999 | Ahamed et al. | 718/105 |
| 5,978,844 A * | 11/1999 | Tsuchiya et al. | 709/221 |
| 6,018,759 A | 1/2000 | Doing et al. | |
| 6,128,279 A | 10/2000 | O'Neil et al. | |
| 6,219,073 B1 | 4/2001 | Suzuoki | |
| 6,223,205 B1 | 4/2001 | Harchol-Blater et al. | |
| 6,363,453 B1 | 3/2002 | Esposito et al. | |
| 6,370,560 B1 * | 4/2002 | Robertazzi et al. | 718/105 |
| 6,449,711 B1 | 9/2002 | Week | |
| 6,567,839 B1 | 5/2003 | Borkenhagen et al. | |

FOREIGN PATENT DOCUMENTS

| | | |
|---|---|---|
| JP | 9-160885 | 6/1997 |
| JP | 9-171405 | 6/1997 |
| JP | 10-11412 | 1/1998 |
| JP | 10-177495 | 6/1998 |
| JP | 8-202667 | 8/1999 |
| WO | WO 94/28492 | 12/1994 |

OTHER PUBLICATIONS

Sterling et al., A Design Study of Alternative Network Topologies for the Beowulf Parallel Workstation, IEEE, p. 626-635, 1996.

Ridge et al., "Beowulf: Harnessing the Power of Parallellism in a Pile-of PCs", IEEE, p. 79-91, 1997.

Lennart Lindh, "Fasthard—A Fast Time Deterministic Hardware Based Real-Time Kernel", IEEE, p. 21,-25, 1992.

Starner et al., "Real-Time Scheduling Co-Processor in Hardware for Single and Multiprocessor Systems", IEEE, p. 509-512, 1996.

Frank Stanischewski, "Fastchart—Performance, Benefits and Disadvantages of the Architecture", IEEE, p. 246-250, 1993.

Adomat et al. "Real-Time Kernel in Hardware RTU: A Step Towards Deterministic and High-Performance Real-Time Systems", p. 164-168, 1996.

\* cited by examiner

FIG. 2

| LOGICAL PORT NO. | PHYSICAL PORT NO. ||
|---|---|---|
| | MAC ID | PORT NO. |
| 0 | 10 | 0 |
| 1 | 10 | 1 |
| 2 | 10 | 2 |
| 3 | 10 | 3 |
| 4 | 10 | 4 |
| 5 | 10 | 5 |
| 6 | 11 | 0 |
| 7 | 11 | 1 |
| 8 | 11 | 2 |
| 9 | 12 | 0 |
| 10 | 12 | 1 |
| 11 | 13 | 0 |
| 12 | 13 | 1 |

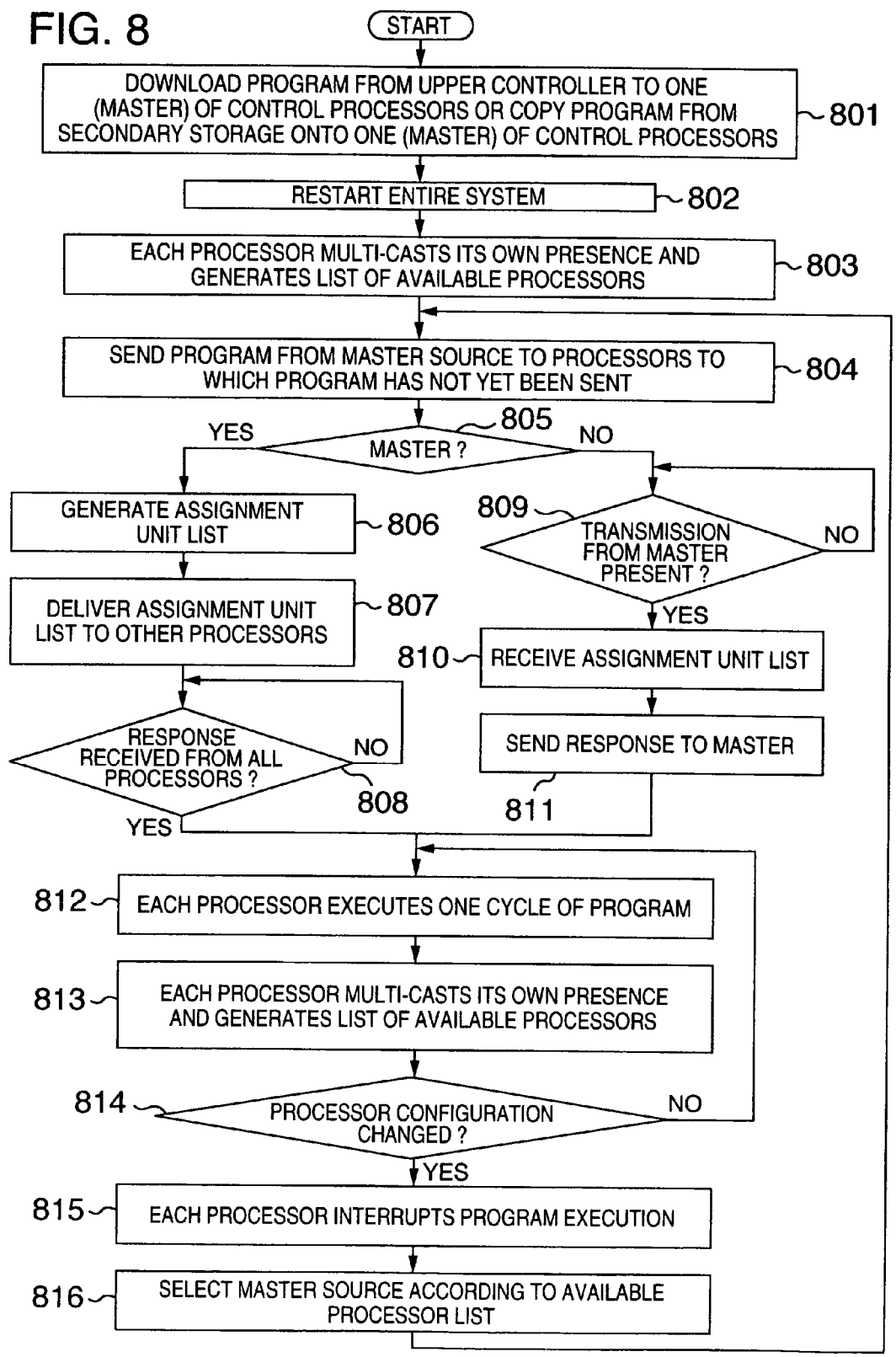

| UNIT NO. | STEP NO. |
|---|---|
| 0 | 3 |
| 1 | 16 |
| 2 | 21 |
| | |
| | |

1201a — 1201b

1202

| SYNCHRONIZA-TION PLACE NO. | STATE |
|---|---|
| 0 | OFF |
| 1 | OFF |
| 2 | ON |
| | |
| | |

1202a — 1202b

1203

| VARIABLE NO. | VALUE |
|---|---|
| 0 | value0 |
| 1 | value1 |
| 2 | value2 |
| | |
| | |

| MAC ID | PORT NO. | STATE |
|---|---|---|
| 10 | 0 | OFF |
| | 1 | ON |
| | 2 | OFF |
| 11 | 0 | OFF |
| | 1 | ON |
| | 2 | ON |
| | | |
| | | |

1301a — 1301b — 1301c

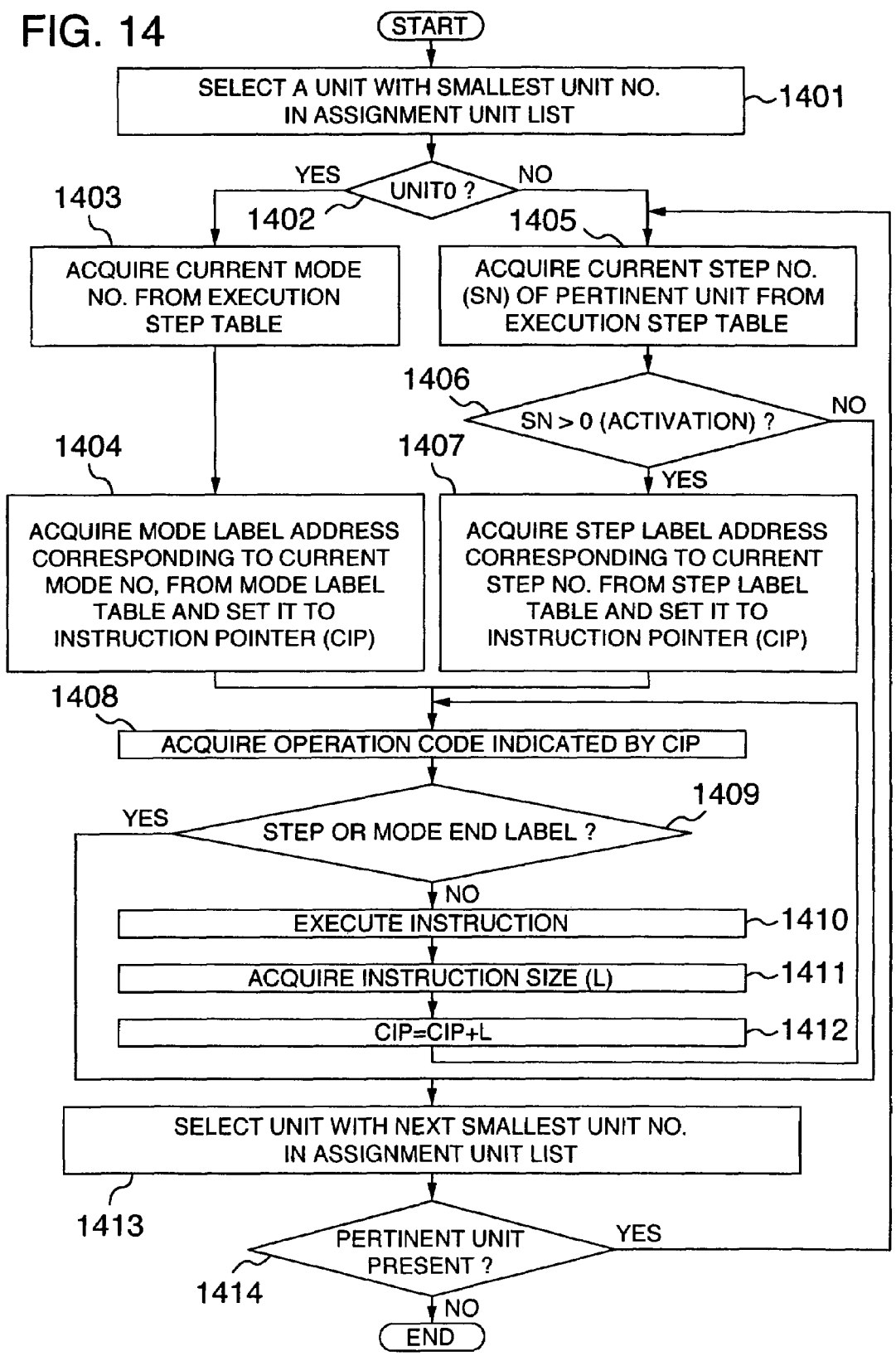

DECENTRALIZED CONTROL SYSTEM FOR NETWORK CONNECTION

This application is a continuation of U.S. patent application Ser. No. 09/398,776, filed Sep. 20, 1999, now abandoned the contents of which are incorporated by reference herein in its entirety.

BACKGROUND OF THE INVENTION

The present invention relates to a decentralized control system in which a plurality of control processors and a plurality of devices are connected to a network.

In a conventional decentralized control system of the prior art, a plurality of controllers are connected to a network and each controller is linked with devices as control objective units. In the system, each controller is individually provided with programs, and programmers create programs in consideration of the relationship of connections respectively between the controllers and the devices. Additionally, it is required that each program includes description of processing to control each device as well as description of synchronization processes between the controllers to control sequence in the overall system. This consequently leads to a problem that the program description becomes complex.

Moreover, when the devices are fixedly connected to each associated controller and the contents of the program of the controller are also fixed, the program of each controller is required to be modified each time the connecting relationship between the controller and the devices is altered. There consequently arises a program that the program modification requires an increased number of steps and the program cannot flexibly cope with changes of the system configuration.

JP-A-10-177495 discloses a decentralized control system, which is known as an example of the decentralized control system connected to a network as above. In the known example, there has been described a method in which a computer as a server converts a program uniformly described in one standard programming language into programs to be executed respectively by a plurality of microcomputers connected to the network and delivers the converted programs to the respective microcomputers.

SUMMARY OF THE INVENTION

In the known example, since the program of the decentralized control system can be uniformly described, it is considered that the program description becomes easier.

However, in the known example, the relationship of allocation of program parts to the microcomputers, namely, the relationship between microcomputers and program parts to be executed thereby is required to be defined beforehand by the programmer. Consequently, there still remains the problem, namely, it is still difficult for the program to flexibly cope with changes of the system configuration.

It is therefore an object of the present invention to provide a decentralized control system and a centralized control method for use with the system connected to a network in which all programs of the system are described in a format and assignment of execution of each program is automatically determined in accordance with constitution of each control processor. This leads to implementation of easy programming independent of the system configuration and hence it is possible to flexibly cope with changes in the system configuration.

In accordance with one aspect of the present invention, there is provided a decentralized control system, comprising a plurality of processors, at least one device controlled by the plural processors, and at least one information transmission path for communicating control information between the plural processors and for communicating input/output information between the plural processors and the device. Each of the plural processors includes processor detecting means for detecting a connection state of each of the plural processors with respect to the information transmission path and program block assigning means for assigning processing of a plurality of mutually concurrently executable program blocks to control the device respectively to the plural processors. In place of the detecting means, there may be provided means to notify or multicast a state of connectibility of its own processor with respect to the information transmission path, namely, availability of the processor to the information transmission path such that the other processors can acquire information of availability of the processor.

BRIEF DESCRIPTION OF THE DRAWINGS

The other objects and features of the present invention will become more apparent from the consideration of the following detailed description taken in conjunction with the accompanying drawings in which:

FIG. 2 is a diagram showing a correspondence, which is used to describe programs, between logical port numbers and physical port numbers of devices;

FIG. 8 is a flowchart showing an overall operation of a decentralized control system in accordance with an embodiment of the present invention;

FIG. 12 is a diagram showing an example of control information;

FIG. 13 is a diagram showing an example of input/output information; and

FIG. 14 is a flowchart showing a program execution procedure.

DESCRIPTION OF THE PREFERRED EMBODIMENTS

Referring now to the accompanying drawings, description will be given of an embodiment in accordance with the present invention.

Figure 1:
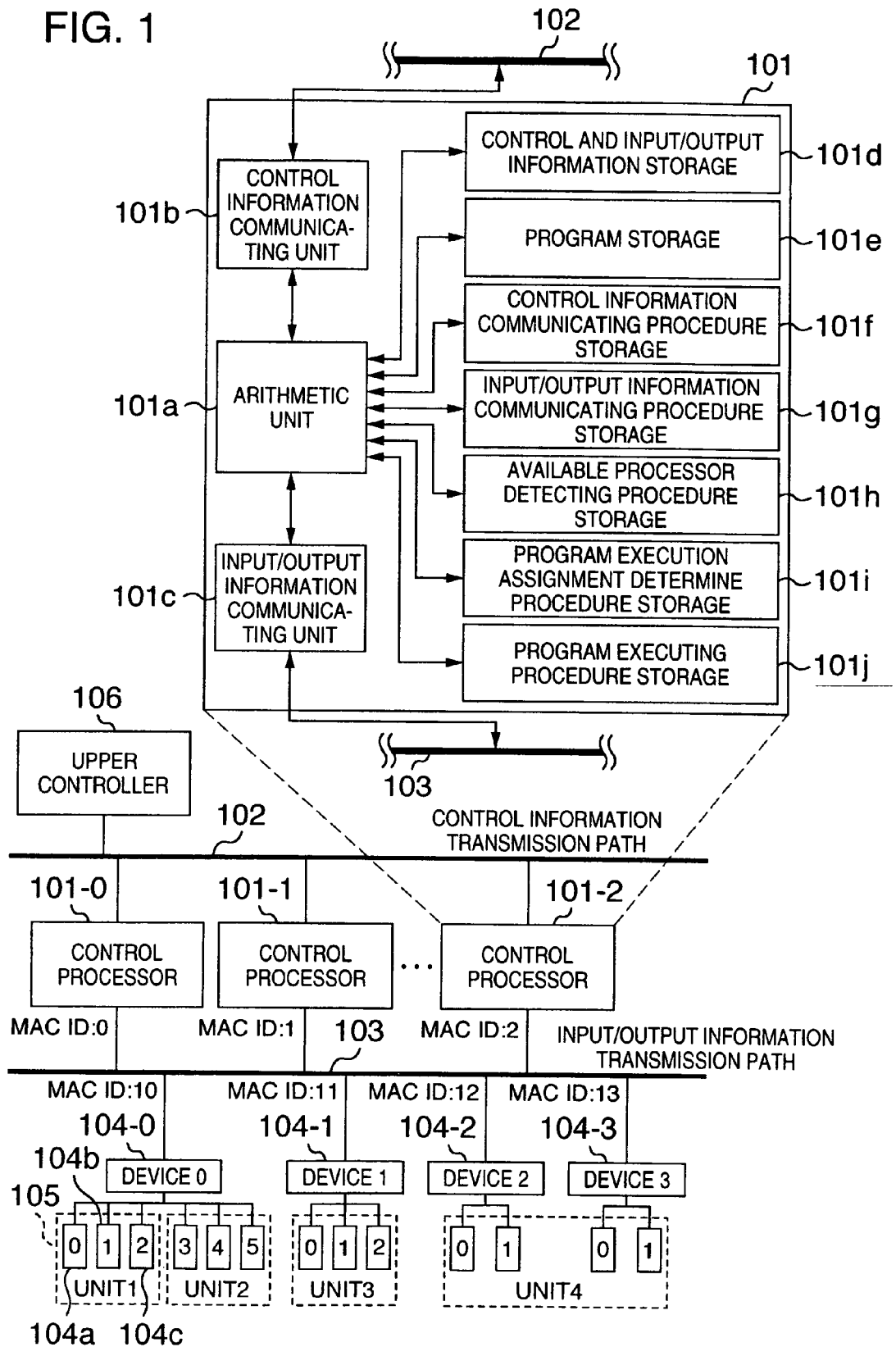
FIG. 1 is a block diagram showing a configuration of a decentralized control system in accordance with an embodiment of the present invention.

FIG. 1 shows in a block diagram a configuration of a decentralized control system in accordance with the present invention. The system includes a control information transmission path 102, an input/output information transmission path 103, and a plurality of control processors 101 (101-0 to 101-2) connected to paths 102 and 103. Connected also to input/output information path 103 are devices 104 (104-0 to 104-3) to be controlled by the system. Input/output information of each device 104 is sent via input/output information path 103 such as a field and a bus to each control processor 101. Additionally, control information to be shared among control processors 101 is transmitted via control information path 102. Moreover, path 102 is also connected to an upper controller 106, which can download programs into control processors 101 and monitor the control information.

Control processor 101 includes an arithmetic unit 101a, which includes a control information communicating unit 101b and an input/output information communicating unit 101c to conduct communication via information transmission paths 102 and 103, respectively. Arithmetic unit 101a communicates control information via control information communicating unit 101b in accordance with a procedure stored in a control information communicating procedure storage 101f and communicates input/output information via input/output information communicating unit 101c in accordance with a procedure stored in an input/output information communicating procedure storage 101g. Information obtained through the communication procedures is stored in a storage 101d for the control and input/output information. Stored in a program storage 101e is a program to control a system sequence and input/output operations of devices 104 as control objects of the system.

In this system, the program is shared among plural control processors 101 to increase the overall processing performance and reliability of the system. For this purpose, each control processor 101 detects an available control processor of the system in accordance with a procedure stored in an available processor detection procedure storage 101h. Either one of the available control processors 101 determines program execution assignment for each available control processor 101 in accordance with a procedure stored in a program execution assignment determination procedure storage 101i and then sends the program execution assignment to each available control processor 101 together with a program. Furthermore, each available control processor 101 executes a program associated with the program execution assignment in accordance with a procedure stored in a program execution procedure storage 101j. Incidentally, a program of the present invention includes a plurality of program blocks which can be executed in a mutually concurrent fashion, which will be described later. Assignment of processing of each program block to associated control processors 101 corresponds to determination of the program execution assignment. Each processor may be provided with, in place of available processor detection procedure 101h, means to notify or transmit its own availability to transmission path 103, and means for collecting information of connection states of other processors with respect to transmission path 103.

Additionally, by connecting control processors 101 and devices 104 to common input/output information transmission path 103, the connection relationship between control processors 101 and devices 104 is not fixed to enable each control processor 101 to control any device 104. In such a configuration, the contents of the program executed by each control processor 101 need not be fixed and processing can be flexibly distributed in association with changes of the system configuration. In the situation, if the program executed by each control processor 101 can be uniformly described independently of the system configuration, the program description will be facilitated.

Moreover, when the configuration of control processors 101 is altered, at least one of the control processors automatically detects the condition and determines program execution assignment to distribute an almost optimal processing load to respective control processors 101. Consequently, it is possible to flexibly cope with a static change of the system configuration, e.g., a change of the configuration before the system start and/or a dynamic change thereof, for example, due to a failure of a constituent component of the system. This improves the processing performance of the overall system and increases reliability of the system at occurrence of a failure.

The program stored in various procedure storages 101f to 101j of FIG. 1 may be beforehand stored in computer-readable recording media such as a compact-disk read-only memory (CD-ROM), a floppy disk, and a semiconductor memory. Alternatively, the program may be loaded via a transmitting media into procedure storages 101f to 101j.

As shown in FIG. 1, control processors 101 and devices 104 connected to input/output information transmission path 103 have respective identification addresses called "media access control identifiers (MAC ID). Additionally, each device 104 has a plurality of input/output ports 104a to 104c, which are controlled according to port numbers in device 104. Each control processor 101 identifies an input/output port directly connected to an actual device operation using a combination of the MAC ID of device 104 and the port number in the device 104 and sends a message to the device for the control thereof.

FIG. 2 shows an example of a relationship of correspondence between a logical port number 201 to describe a program and a physical port number 202 of a device. For example, a 0-th logical port corresponds to a 0-th port of a device having a MAC ID of 10. By allocating a sequence of logical port numbers 201 to respective physical ports 202 as above, the programmer can describe a program without paying attention to a MAC ID 202a and a port number 202b. In this connection, to convert the program into an executable form, port numbers are changed using a correspondence table of logical and physical port numbers as shown in FIG. 2. Accordingly, there is determined a relationship between the control processors and physical ports to be operated respectively by the control processors.

The decentralized control system in accordance with the present invention employs a program describing method implemented by expanding the cell control language described in U.S. Pat. No. 5,555,179 which is assigned to the present assignee and corresponds to JP-A-7-72920. The disclosure of the U.S. Pat. No. is incorporated herein by reference. In the cell control language, an operation sequence of each device constituting a system is expressed in a Petri net and processing of each step of the sequence is described in a high-level language like a robot language. Moreover, a set of devices achieving a certain function in which the devices can simultaneously operate in a mutually concurrent fashion are collectively defined as a unit, and a sequence is described for each unit. A unit, which is defined by a programmer, is a functional unit constituting the system and can be software-wise treated as a concurrent process. A set of these units constitute the system.

FIG. 1 shows an example of definitions of units. In FIG. 1, input/output ports 104a to 104c of devices 104 are directly connected to actual device operations. A set including a plurality of input/output ports is equivalent to a unit. Consequently, a group including several input/output ports is defined as a unit 105 enclosed by a broken line. For example, a set of units connected to ports 0 to 2 of device 0 are collectively defined as a first unit, i.e., unit 1. Similarly, a set of units connected to ports 0 and 1 of device 2 and a set of units connected to ports 0 and 1 of device 3 are collectively defined as unit 4. In this way, the definition of a unit as a function unit is independent of the unit of device 104 itself. In this regard, an n-th unit is represented as unit n herebelow.

Figure 3:
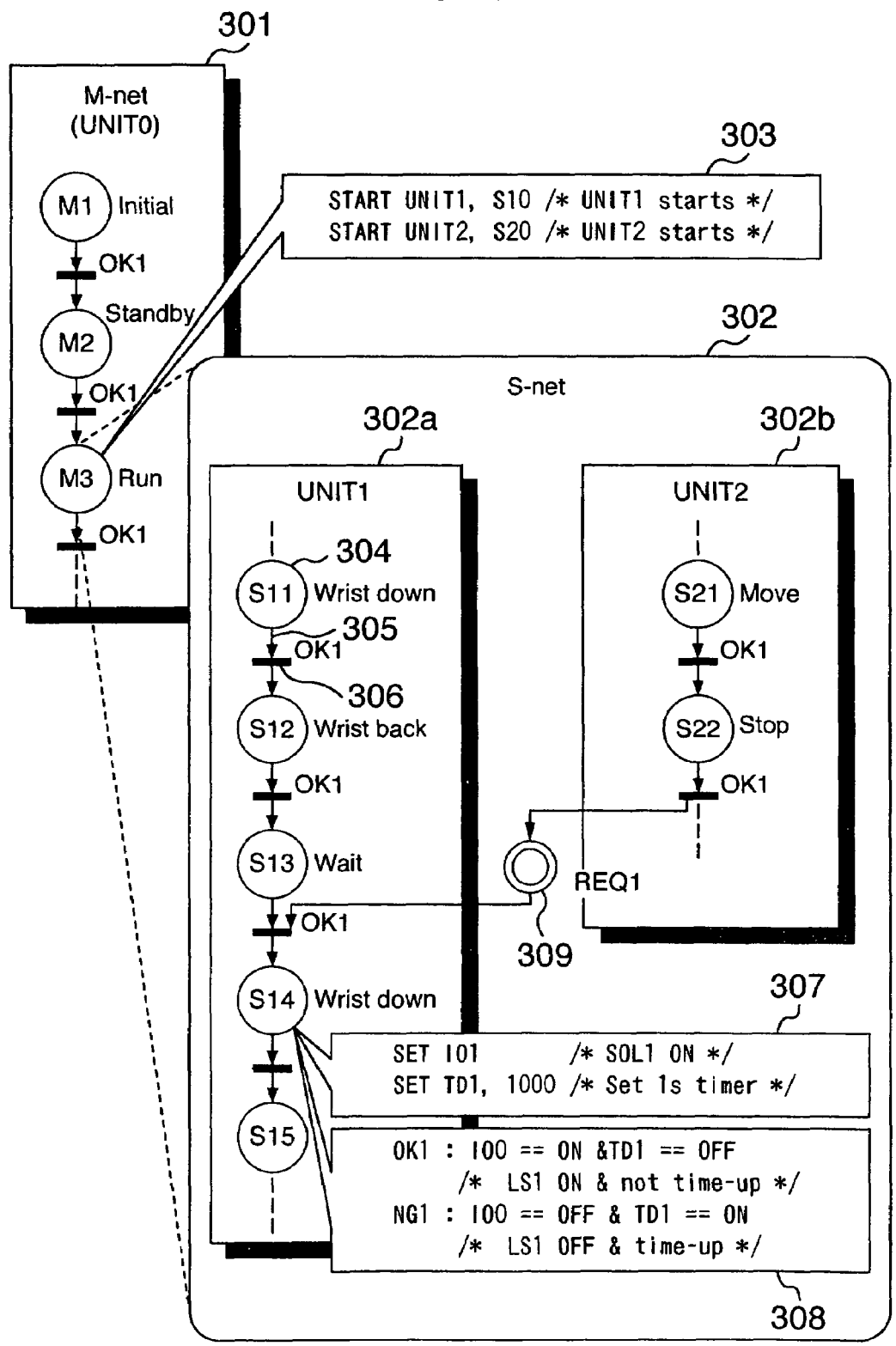
FIG. 3 a diagram showing an example of a program configuration described in a cell control language.

FIG. 3 shows an example of a program layout described in a cell control language. As shown in this diagram, a program in the cell control language includes two kinds of modules, namely, a Petri net 301 describing transitions of an operation mode of an overall system and a Petri net 302 describing a sequence of each unit in each of the operation modes. In this connection, the former is called "mode-net (M-net)" and the latter "sequence-net (S-net)". Assume that M-net 301 is one module and is called a 0-th unit (unit 0). In a place (indicated by a small circle) of M-net 301, there is described a symbol for discrimination of each mode. For example, M3 indicates a third mode. S-net 302 is described for each unit in each mode. In the example of FIG. 3, there are described two modules including S-net 302a of unit 1 and S-net 302b of unit 2. These S-nets represent sequences of units which concurrently operate in a mode (M3). To initiate the S-nets, a command string 303 is described for the processing in M3 of M-net 301.

A place 304 of S-net 302 indicates a unitary operation (step) in the sequence. Described in each place 304 is a symbol to discriminate each step. For example, S11 indicates an eleventh step. A transition (indicated by a minus sign) 306 expresses a state transition from one step to another step. An arc (indicated by an arrow mark) 305 connects place 304 to transition 306 and represents a state transition in the arrow direction. Additionally described for each place 304 is a command 307 representing the contents of an operation of the step and a terminating condition 308 of the step. For example, command 307 of S14 expresses processing in which a logical input/output port IO 1 is turned on and a one-second timer TD 1 is set. Terminating condition 308 is an OK or NG condition. The OK and NG conditions are described as OK n (n is an OK condition number) and NG n (n is an NG condition number), respectively. For example, an OK 1 condition for terminating condition 308 of S14 is "port IO 0 is on and timer TD 1 is off", and an NG 1 condition is "port IO 0 is off and timer TD 1 is on". Furthermore, either one of the conditions for terminating condition 308 of place 304 is described as an additional condition of transition 306 connected as an output from place 304. For example, an additional condition of the output transition S11 is "OK 1 condition" of S11. The fundamental describing method above is also applicable to the M-nets.

Two S-nets 302a and 302b shown in FIG. 3 are connected via a synchronization place 309 indicated by a double circle. In FIG. 3, REQ n (n is a synchronization place number) is described in synchronization place 309.

When synchronization place 309 is set as an output from a transition of an S-net and simultaneously as an input to a transition of another S-net, there is represented synchronization between the two S-nets. That is, the first S-net connected to synchronization place 309 as an output notifies a point of synchronization timing to the second S-net. The second S-net connected to synchronization place 309 as an input waits for reception of a point of synchronization timing from the first S-net. In FIG. 3, when step S13 of unit 1 is terminated with OK 1 and step S22 of unit 2 is terminated with OK 1, there occurs a transition to step S14 in unit 1. Incidentally, whether or not synchronization place 309 is activated (on/off) is required to be shared among the control processors as control information for synchronization between the units of the system.

Figure 4:
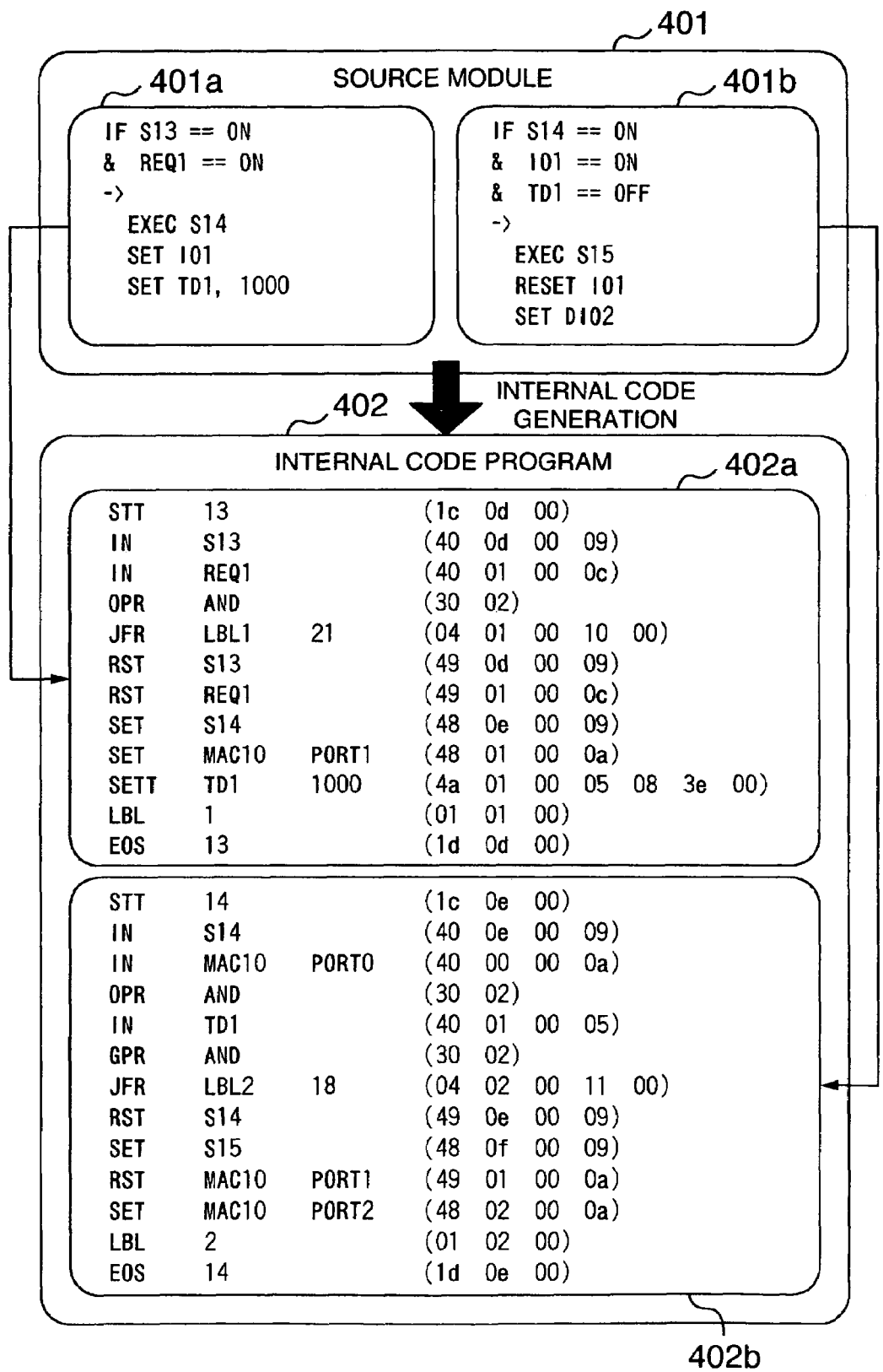
FIG. 4 is a diagram showing part of a source module generated when S-nets are saved and an example of an execution format generated by converting the source module.

FIG. 4 shows part of a source module generated when S-nets are saved and an example of an execution format obtained by converting the module into a format executable in the control processor. In this diagram, a source module 401 is part of a source module generated using S-net 302a shown in FIG. 3 and an internal code program 402 is obtained by converting the module into an execution format. Source module 401 includes rules 401a and 401b in an IF—Then format having a one-to-one correspondence to respective transitions of S-net 302a. For example, rule 401a corresponds to a transition on the output side of step S13 and represents a rule in which when S13 terminates with OK 1 and a synchronization place REQ 1 is activated, S14 is activated to execute commands thereof.

Internal code program 402 includes blocks 402a and 402b respectively corresponding to rules 401a and 401b of source module 401. Each of blocks 402a and 402b includes a string of internal code instructions, which are sequentially executed by the pertinent control processor. In this regard, each instruction includes a one-byte operation code (e.g., IN) and a fixed-length operand following the code. Moreover, blocks 402a and 402b are equal in configuration to each other. That is, each block begins with an instruction "STT n (n is a step number" and ends with an instruction "EOS n (n is a step number)". The former is a step label and the latter is a step end label. A block enclosed with these labels paired is called a step block. In this connection, the block structure also applies to the M-nets, namely, an internal code block thereof includes a mode block enclosed with a mode label and a mode end label.

Figure 5:
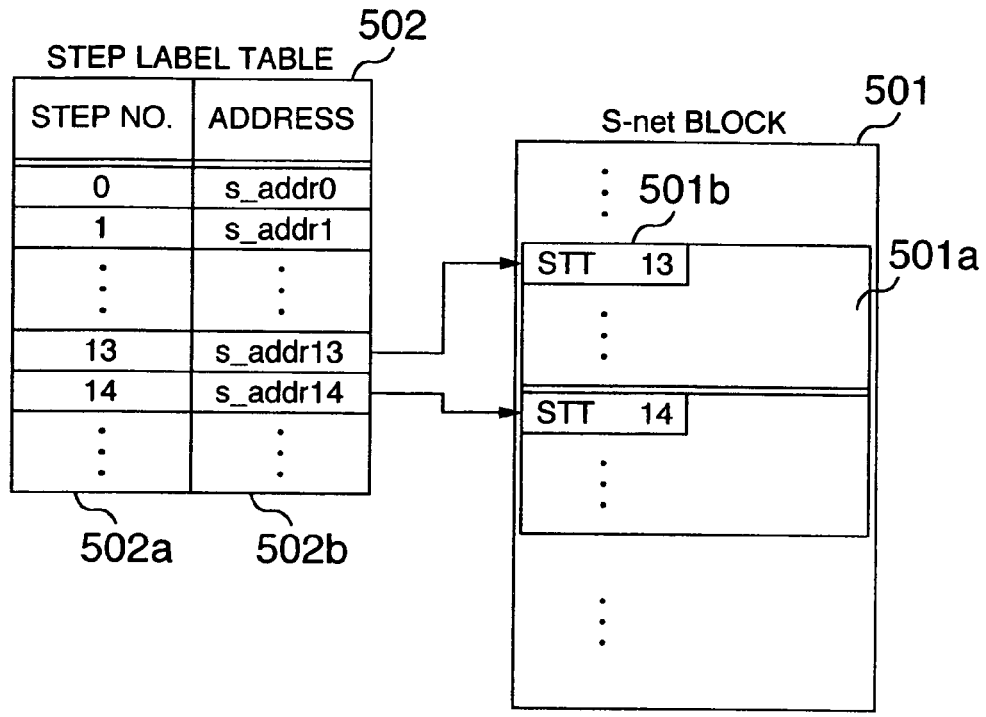
FIG. 5 is a diagram showing a relationship between a block including S-net in an internal code representation and a step label table used to execute the block.

FIG. 5 shows a relationship between an S-net block 501 which is an internal code representation of an S-net and a step label table 502 for execution of the block. Step block 501a, like the blocks of FIG. 4, begins with a step label 501b. Registered to step label table 502 is an address 502b of step label 501b in the program in association with each step number 502a. When the program is being executed, an execution state of each unit, namely, a step in execution of the S-net is uniquely determined. A current step number of each unit thus determined is stored as control information in the control processor. To execute a program, the current step number of each unit is obtained therefrom and then a step label address corresponding to the step number is acquired from step label table 502. Furthermore, the address is set to an instruction pointer and then control jumps to a step block to be executed.

Figure 6:
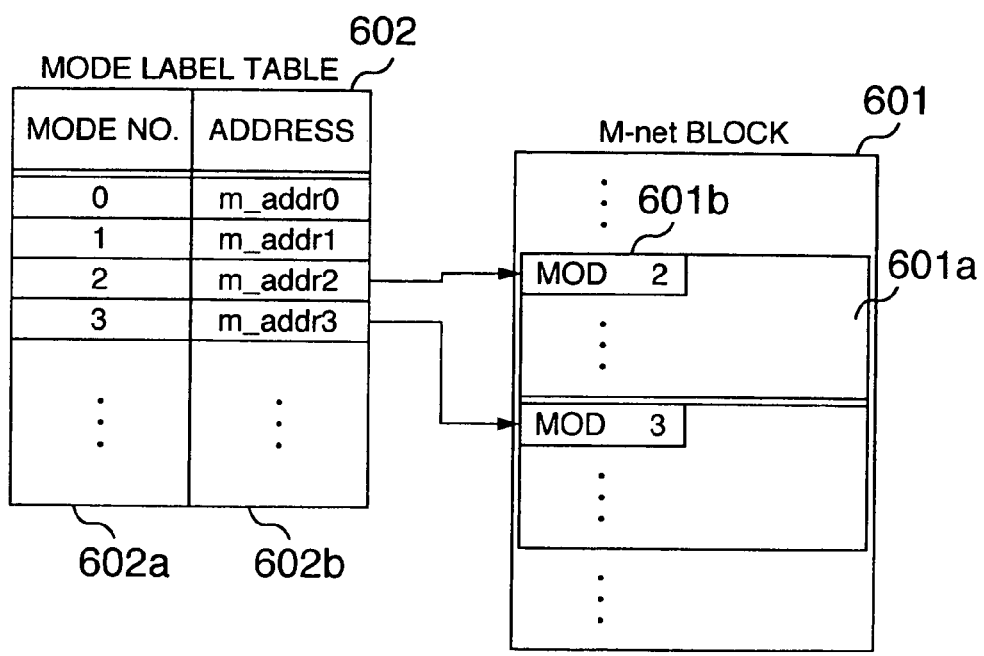
FIG. 6 is a diagram showing a relationship between a block including an M-net in an internal code representation and a mode label table used to execute the block.

FIG. 6 shows a relationship between M-net block 601 generated by representing the M-net in an internal code and a mode label table 602 used to execute block 601. In the diagram, a mode block 601a begins with a mode label 601b. For each mode number 602a, an address 602b of mode label 601b is registered to mode label table 602. To execute a program, the current mode number is attained from the control information, a mode label address corresponding thereto is acquired from mode label table 602, the address is set to an instruction pointer, and then control goes to a mode block to be executed.

Incidentally, FIG. 4 shows a partially modified example of the source module. However, in an actual program, the M-net module is combined with all S-net modules to be converted into one internal code program.

Figures 7, 9:
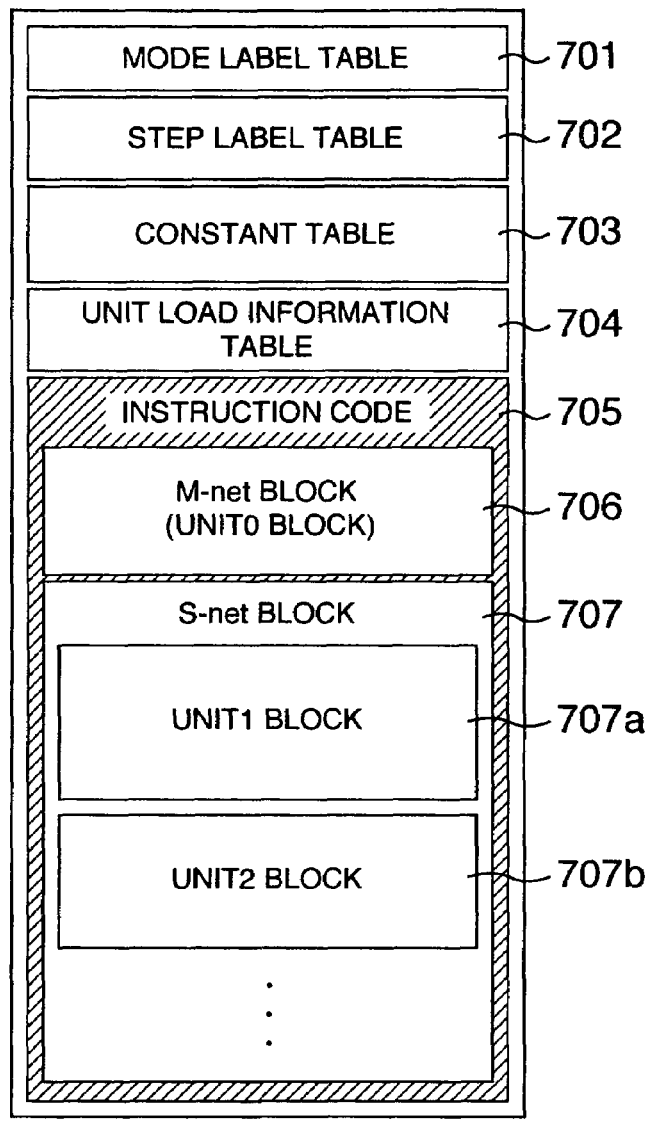
FIG. 7 is a diagram showing a layout of an internal code program.
FIG. 9 is a diagram showing an example of an available processor list.

FIG. 7 shows a layout of an internal code program finally generated as described above. An instruction code 705 is a string of internal code instructions respectively corresponding to the contents of the M-net and the S-nets and includes an M-net block 706 and an S-net block 707. In this layout, M-net block 706 is assumed as a block of unit 0. S-net block 707 includes blocks obtained by representing S-nets of each unit in an internal code, for example, a block 707a of unit 1 and a block 707b of unit 2. In this connection, a block including the internal code of each respective unit is called a unit block. Stored respectively in a mode label table 701 and a step label table 702 are a mode label address and a step label address in instruction code 705. In a constant table 703, there is stored information related to various constants appearing in instruction code 705. In a unit load information table 704, there is stored for each unit an average number of instructions processed by each unit block to execute the program.

Unit load information table 704 of this diagram is employed to determine program execution assignment of each control processor, namely, to allocate unit blocks to respective control processors. The average number of instructions processed by each unit stored in unit load information table 704 is calculated when the pertinent program is converted into an internal code. For example, step blocks 402a and 402b of FIG. 4 are instruction strings respectively processed when the current steps are S13 and S14. Step blocks 402a and 402b include 12 and 13 instructions, respectively. To calculate the average number of instructions, the total number of all instructions of the unit blocks is divided by the number of step blocks in the unit blocks.

FIG. 8 shows in a flowchart an overall operation of a decentralized control system in accordance with an embodiment of the present invention. First, one of the control processors is selected and then an internal code program to be executed is downloaded into a program storage of the processor via a control information transmission path 102 from an upper-level controller or is copied from a secondary storage media onto the program storage (process 801). Next, the overall system is restarted (process 802). Each control processor multicasts, to notify presence thereof to the other control processors, a message including attributes thereof such as its own MAC ID and a processor type to control information transmission path 102. Each partner control processor receives the message and then generates a list of available control processors (to be referred to as an available processor list herebelow; process 803). The available processor detecting procedure shown in FIG. 1 is provided to generate the available processor list. At system restart, a control processor first received the program is determined or set as a program delivery source, i.e., a master and sends the program via control information transmission path 102 to other control processors not having received the program (process 804). Next, the control processor as the master (process 805) generates a list including unit blocks assigned to the respective control processors (to be referred to as an assignment unit list) in accordance with program execution assignment determining procedure 101j (process 806). The master delivers the list generated to the other control processors (process 807). In this situation, each partner control processor having received the assignment unit list returns a reply of reception to the master. The master consequently waits for reception of the reply of reception from all control processors. When the reply is completely received therefrom, the master starts it operation (process 808). Any control processor other than the master (process 805) waits for delivery of the assignment unit list from the master (process 809) and then receives the list (process 810). Thereafter, the control processor returns a replay of reception to the master (process 811). Next, each control processor executes one cycle of a program block of a unit indicated by the assignment unit list thereof (process 812). After execution of one program cycle, each control processor multicasts presence thereof onto control information transmission path 102. As above, each control processor generates an available processor list (process 813). The available processor list just generated is then compared with that previously generated. If the configuration of available control processor is kept unchanged (process 814), control goes to process 812 to continuously execute the program. If the configuration has been changed (process 814), the control processor interrupts the program execution (process 815), selects one of the control processors having the smallest MAC ID in the available processor list to set the control processor as a master (process 816), and then control goes to process 804. Repetitiously executing the processes above, the decentralized control system of the present invention achieves a desired control operation.

FIG. 9 shows an available processor list. In the list, the available control processors detected by each control processor are sorted in an ascending order of MAC ID 902 (the pertinent control processor is also included in the available control processors) and are assigned with respective processor numbers 901. Also stored in the available processor list is information of a type 903 of each control processor. In this regard, the available processor list shown in FIG. 9 is generated by each control processor (which is also an available control processor). However, alternatively, a control processor as the master may generate an available processor list to deliver the list to the other available control processors.

Figure 10:
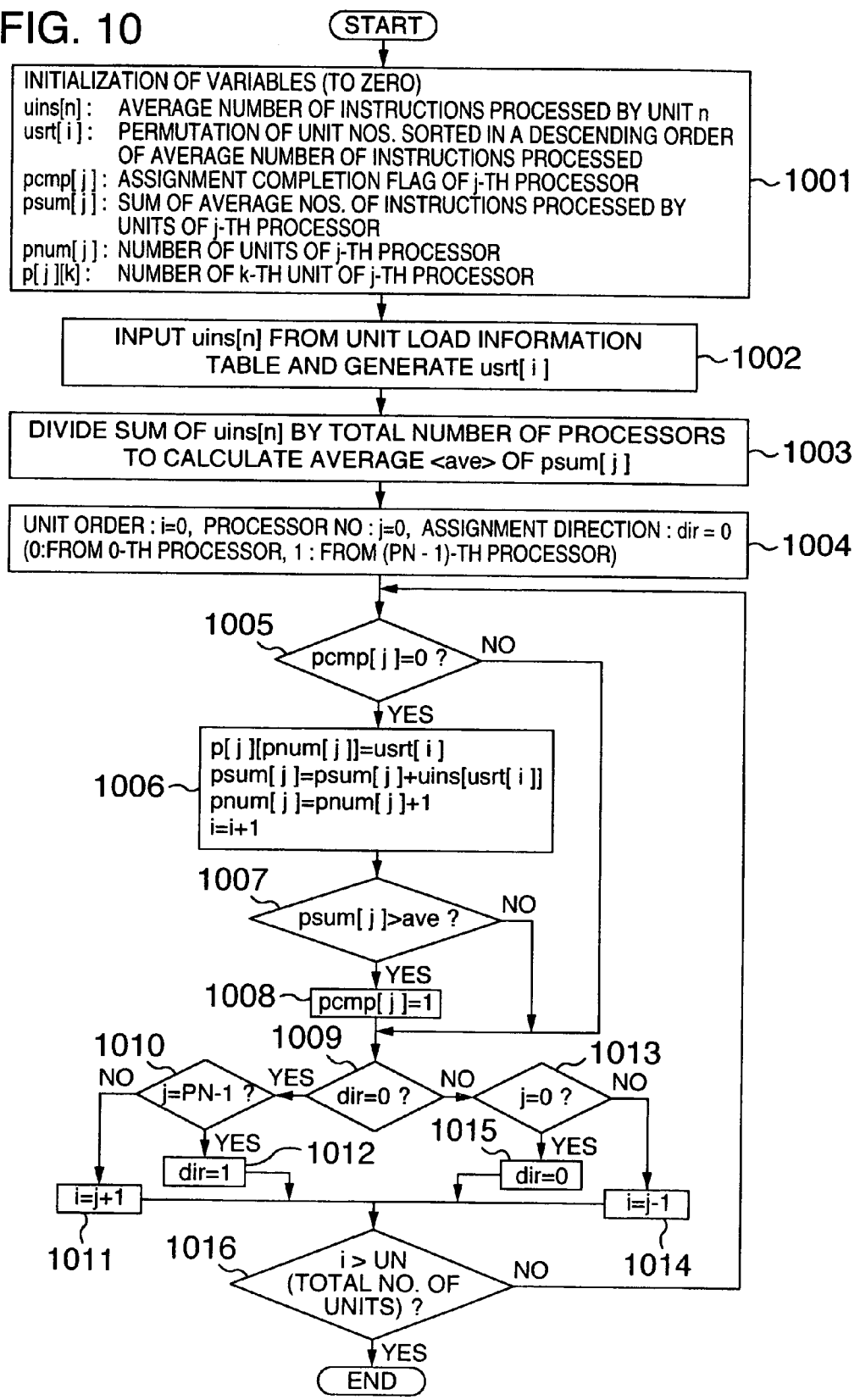
FIG. 10 is a flowchart showing operation to generate an assignment unit list.

FIG. 10 shows in a flowchart an operation to generate an assignment unit list. First, the values of array variables to be used in the subsequent processes are initialized to zero (process 1001). In the flowchart, uins[n] is a variable to store the average number of instructions processed by unit n ($0 \leq n \leq UN$; UN is the total number of units); usrt[i] is a permutation of unit numbers of unit blocks sorted in a descending order of the average number of instructions; i ($0 \leq i \leq UN$) indicates a sequence order after the sorting; pcmp[j] is a flag indicating whether or not unit block assignment has been completed to j-th processor (a processor with a processor no. of j; $0 \leq j \leq UN$; PN is the total number of processors) and 0 indicates assignment not completed and 1 indicates assignment completed; psum[j] is the sum of the average numbers of instructions of unit blocks in the j-th processor; pnum[j].is the number of units of the j-th processor; p[j][k] indicates a unit number of a k-th unit block ($0<k<UN$) of the j-th processor. When the variables are initialized, uins[n] is acquired from a unit load information table to be sorted in a descending order in usrt[i] (process 1002). Subsequently, the sum of uins[n] is divided by PN to calculate an average (ave) of psum[j]. Moreover, variables to be used in the subsequent processes, i.e., unit sequence order i after the sorting, processor no. j, and assignment direction dir for each processor are initialized to zero (process 1004). In the following processes, the unit blocks are assigned to the respective processors in a descending order of average number of instructions processed. Namely, the assignment is first achieved in an ascending order of processor number. After one unit block is thus assigned to all processors, the assignment is then achieved in a descending order of processor number. During the assignment thus repetitiously conducted, when the sum of average numbers of instructions processed becomes ave for any processor, the assignment is completed for the processor. Thereafter, the assignment is conducted for the other processors. First, when the assignment to the j-th processor is not completed yet (process 1005), a unit block with order i is assigned to the j-th processor and then one is added to order i (process 1006). In this situation, if the sum of average numbers of instructions processed is equal to or more than ave for the j-th processor (process 1007), the assignment completion flag is set (process 1008). When the assignment direction is a 0th direction for the processor (process 1009), one is added to j (process 1011) if the processor number is other than the maximum value (process 1010). If the processor number is equal to the maximum value (process 1010), the assignment direction is changed to a (PN−1)-th direction (process 1011). Additionally, when the assignment direction is a (PN−1)-th direction for the processor (process 1009), one is subtracted from j (process 1014) if the processor number is other than 0 (process 1013). If the processor number is 0 (process 1013), the assignment direction is changed to the 0th direction (process 1015). Finally, if order i of a subsequent unit block to be assigned exceeds UN, the assignment is completed; otherwise, control goes to process 1005 (process 1016). The procedure above is an example of the program execution assignment determining procedure in which the assignment unit list can be calculated to substantially uniformly assign the processing load to the respective processors in a minimized number of calculation steps.

Figure 11:
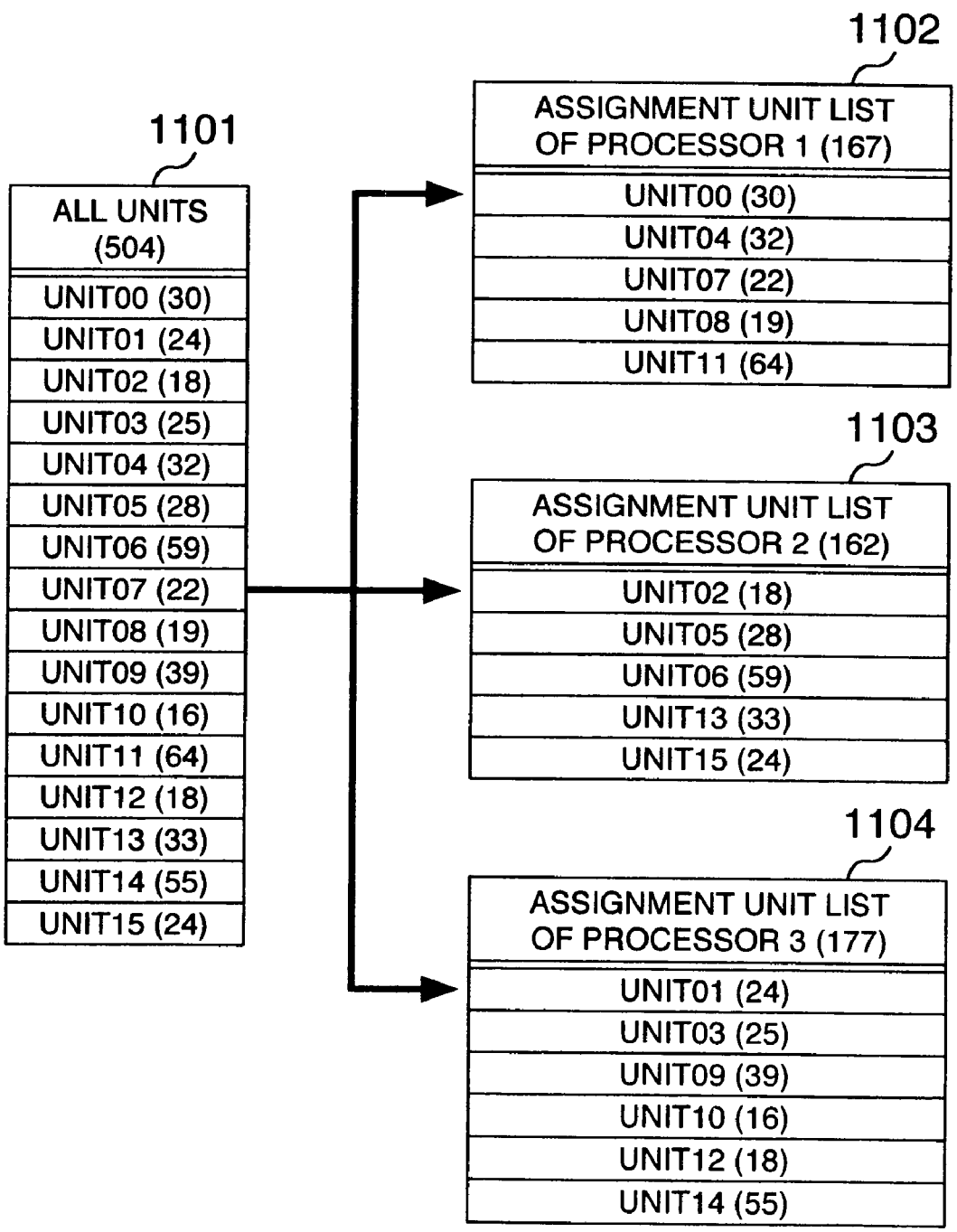
FIG. 11 is a diagram showing an example of an assignment unit list generated in the procedure of FIG. 10.

FIG. 11 shows examples of the assignment unit list generated in the procedure of FIG. 10. In a unit load information table 1101, there is stored, for each unit, information of the average number of instructions processed by the unit. The average number is enclosed with parentheses. Unit load information table 1101 includes 16 unit blocks, i.e., a unit block of the M-net (unit 0) and unit blocks of unit 1 to unit 15. These unit blocks are assigned to three control processors 1 to 3 as indicated by assignment unit lists 1102 to 1104. The total values of the average numbers of instructions respectively processed by the units of the respective processors are respectively 167, 162, and 177. This indicates that the processing load is approximately uniformly shared among the processors. The assignment unit lists are delivered to the partner control processors, which each need only execute the unit blocks of their own in accordance with the assignment unit lists. With the decentralized control operation, the processing load of each control processor is reduced by increasing the number of the control processors, which increases the overall processing performance of the system. Incidentally, the assignment unit lists are generated by a control processor as the master and are delivered to the other available control processors. However, it may alternatively also be possible that each of the available control processors generates the assignment unit list.

FIG. 12 shows an example of control information. An execution step table 1201 stores information concerning a current execution step of each unit of the system and includes a current step number 1201*b* for each unit number 1201*a*. In this regard, step number 1201*b* corresponding to unit number 1201*a* equal to zero indicates a current mode number. Additionally, when step number 1201*b* is zero, it is indicated that the pertinent unit is not operating in the mode. A synchronization place state table 1202 stores information to indicate whether or not each synchronization place is activated and includes a state 1202*b* (on/off) for each synchronization place number 1202*a*. A common variable table 1203 stores information concerning variables commonly used in the overall system and includes a value 1203*b* for each variable number 1203*a*. In this connection, a plurality of similar tables may be disposed in accordance with a type (an integer, a real number, or the like) of the common variable. The control information includes, in addition thereto, the available processor list shown in FIG. 9 and the assignment unit list shown in FIG. 11.

FIG. 13 shows an example of input/output information. In an input/output state table 1301, there is stored for each device, a state 1301*c* (on/off) for an MAC ID 1301*a* and a port number 1301*b* associated there with. Although the input/output information of this example is in binary notation (on/off), other input/output information, for example, a number of encoder pulses representing a rotary angle of a motor may also be provided.

The control and input/output information shown in FIGS. 12 and 13 is updated and referred to by each control processor. The decentralized control system of the present invention provides a mechanism in which the information above is delivered via the control and input/output information transmission paths to the respective processors so that the same information is shared among the processors. That is, various information updated when a control processor executes a program is multicast via an associated transmission path to the other control processors. The processor having received the information updates its own information according to the information received and refers to the information to execute a program.

FIG. 14 shows in a flowchart a program executing procedure. To execute a program, there are required the same program (the internal code program shown in FIG. 7) delivered to each control processor, the same control and input/output information (the tables shown in FIGS. 12 and 13) similarly delivered to each control processor, and the assignment unit lists (the tables shown in FIG. 11) generated for each control processor. FIG. 14 shows one cycle of processing of program execution. In this regard, one cycle indicates for each control processor a cycle in which the processor executes its own unit blocks assigned thereto in an ascending order of unit numbers. First, a unit with the smallest unit number is selected from the assignment unit list (process 1401). In this situation, when the unit selected is unit 0 (process 1402.), a current mode number is acquired from the execution step table (process 1403). Moreover, an address of a mode label corresponding to the current mode number is obtained from the mode label table associated with the program and assigns the address to the instruction pointer (CIP; process 1404). If the selected unit is other than unit 0 (process 1402), a current step number (SN) of the pertinent unit is acquired from the execution step table (process 1405). If SN exceeds zero, namely, if the pertinent unit is activated at this point (process 1406), an address of a step label corresponding to the current step number is acquired from the step label table and then the address is assigned to CIP (process 1407). Next, an operation code of an instruction indicated by CIP is attained (process 1408). In this situation, if the operation code is neither a step end label nor a mode end label (process 1409), the instruction is interpreted to be executed (process 1410). A size (L) of the instruction is obtained in this operation (process 1411) and the size is added to CIP to thereby update CIP (process 1412). CIP thus updated indicates an address of an instruction to be next executed. Control then returns to process 1408 to continuously execute the next instruction. Furthermore, if the operation code is a step or mode end label (process 1409), it is assumed that the pertinent unit block has been executed up to the last point of the current step block. Therefore, a unit with a next smallest unit number is selected from the assignment unit list (process 1413). If the pertinent unit is present in this operation, control returns to process 1405; otherwise, execution of one program cycle is completely terminated (process 1414).

In accordance with the decentralized control system described above, the programming can be achieved independently of the system configuration, i.e., the configuration of control processors. This improves the programming development performance. Additionally, in accordance with the control processor configuration, the program execution assignment is automatically determined to substantially uniformly impose the processing load on the respective control processors. Consequently, it is possible to flexibly cope with static and/or dynamic changes of the system configuration and hence the processing performance and reliability of the system are increased. For example, if a control processor is additionally installed when the system is in a stopped or halt state or in operation, the condition is automatically detected and the program execution assignment is again conducted to uniformly distribute the processing load to the respective control processors in the system including the control processor added. It is therefore possible to easily increase the processing performance of the entire system. Moreover, if a failure occurs in either one of the control processors when the system is in a stopped or halt state or in operation, the condition is automatically detected and the program execution assignment is again carried out to uniformly impose the processing load on the respective control processors in the system excepting the control processor failed. This improves reliability of the system.

Incidentally, in the embodiment of the present invention, the expression according to the Petri net shown in FIG. 3 is employed as the program description method. However, for an alternative embodiment, a sequential function chart (SFC) which is almost equivalent to the Petri net may be adopted. Additionally, in consideration of the structure of the program of the present invention in which the program includes a plurality of mutually concurrently executable processes, even when a programming language such as a ladder diagram is utilized, if the program can be subdivided into concurrently executable blocks in its description, the blocks can be treated as units. This enables the processes to be executed in almost the same manner as for the embodiment above.

Moreover, in the embodiment of the present, as a method to determine program execution assignment to each control processor, there is employed a method using the average number of instructions in one cycle of each unit block as shown in FIGS. 10 and 11. However, in an alternative embodiment, there may be employed a method using a period of processing time of one cycle of each unit. In other words, as unit load information to be included in an associated program, an average processing time of one cycle is calculated for each unit block and is stored in a storage such that the unit block assignment is achieved according to the unit load information. Moreover, in addition to the assignment according to the processing load, there may be used unit block assignment in consideration of an internal storage capacity of each control processor.

Additionally, in accordance with the embodiment of the present invention, the same program is sent to all available control processors such that each control processor executes only the unit blocks of the program assigned thereto as shown in FIG. 8. However, there may be utilized in an alternative embodiment a method in which only the unit blocks assigned to each control processor are sent thereto in the program transmission stage. In this case, however, it is required that the program including all unit blocks are transmitted to several control processors to guarantee that the unit block assignment is again accomplished when the control processor configuration is altered.

Furthermore, in accordance with the embodiment of the present invention, an available processor detecting procedure and a program execution assignment determining procedure are disposed in each control processor. However, in an alternative embodiment, the functions may be provided for the upper-level controller 106 connected to the control information transmission path shown in FIG. 1. Namely, controller 106 detects available control processors, accordingly determines program execution assignment to the available control processors, and sends to each control processor programs to be executed and information concerning the program execution assignment of the control processor.

Moreover, in the description of the embodiment of the present invention, the system includes two channels of information transmission paths, i.e., the control information transmission path and the input/output information transmission path. However, it may also be possible in an alternative embodiment to construct a system in which these information transmission paths are constructed as one transmission system or a system including three or more information transmission paths.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A decentralized control system, comprising:
a plurality of processors;
a plurality of devices controlled by said plurality of processors; and
at least one information transmission path for communicating control information between said plurality of processors and for communicating input/output information between said plurality of processors and the devices,
wherein each of said plurality of processors comprises:
processor detecting means for detecting a connection state of each of said plurality of processors with respect to the information transmission path, said connection state showing which processors of said plurality of processors are connected for controlling the plurality of devices, and being represented by an ID of each of said processors,
wherein said processor detecting means generates a list of available processors,
wherein each of said plurality of processors comprises:
program block assigning means for assigning, based on the detected connection state detected by said processor detecting means, a plurality of mutually concurrently executable program blocks to control the device to each of said plurality of processors, respectively,
wherein said program block assigning means divides a program for controlling said devices into said mutually concurrently executable plurality of blocks allowing uniform assignment of a processing load to the processors in accordance with an average number of execution steps or an average processing time for one cycle of each of the plurality of program blocks, generates an assignment list, and distributes the assignment list and said mutually concurrently executable plurality of blocks to said processors; and
program storage means for storing a relevant one of the plurality of mutually concurrently executable program blocks at each of said plurality of processors, each of said plurality of processors executing the stored relevant program blocks, respectively, and
wherein each of said plurality of processors distributes said mutually concurrently executable plurality of blocks and said assignment list, and executes the program blocks based on said assignment list.

* * * * *